US012269042B2

(12) United States Patent
Bates et al.

(10) Patent No.: US 12,269,042 B2
(45) Date of Patent: Apr. 8, 2025

(54) SYSTEMS AND METHODS FOR PROCESSING CROPS HARVESTED FROM FIELDS

(71) Applicant: MONSANTO TECHNOLOGY LLC, Saint Louis, MO (US)

(72) Inventors: Walter J. Bates, Godrey, IL (US); Daniel Beisiegel, Latham, IL (US); Robert A. Brachtenbach, Stratton, CO (US); Sam S. Dalby, Grover, MO (US); William G. Henderson, Jr., Aiken, SC (US); Christopher Wayne Noble, Arco, MN (US)

(73) Assignee: Monsanto Technology LLC, Saint Louis, MO (US)

( * ) Notice: Subject to any disclaimer, the term of this patent is extended or adjusted under 35 U.S.C. 154(b) by 247 days.

(21) Appl. No.: 17/893,960

(22) Filed: Aug. 23, 2022

(65) Prior Publication Data

US 2023/0064089 A1 Mar. 2, 2023

Related U.S. Application Data

(60) Provisional application No. 63/236,501, filed on Aug. 24, 2021.

(51) Int. Cl.

| | |
|---|---|
| ***B02C 4/28*** | (2006.01) |
| ***B02C 4/16*** | (2006.01) |
| ***B02C 11/04*** | (2006.01) |
| ***B02C 25/00*** | (2006.01) |

(52) U.S. Cl.
CPC ................ *B02C 4/286* (2013.01); *B02C 4/16* (2013.01); *B02C 11/04* (2013.01); *B02C 25/00* (2013.01)

(58) Field of Classification Search
CPC .. B02C 4/28; B02C 4/286; B02C 4/06; B02C 4/16; B02C 4/24
See application file for complete search history.

(56) References Cited

U.S. PATENT DOCUMENTS

| | | | | |
|---|---|---|---|---|
| 3,501,101 | A * | 3/1970 | Lindstrom ............ | B01F 33/502 241/98 |
| 2015/0117984 | A1* | 4/2015 | Fitzgerald ............ | A01C 15/003 414/21 |
| 2019/0045714 | A1* | 2/2019 | Hutcheon .............. | B65G 67/24 |

FOREIGN PATENT DOCUMENTS

| | | | |
|---|---|---|---|
| CA | 3087371 | A1 | 8/2018 |
| GB | 1071233 | A | 6/1967 |

* cited by examiner

*Primary Examiner* — Bobby Yeonjin Kim
(74) *Attorney, Agent, or Firm* — Harness, Dickey & Pierce, P.L.C.

(57) ABSTRACT

Systems and methods are provided for processing seeds collected from a field. One example system includes a trailer supporting a hopper configured to hold seeds to be devitalized, a mill configured to devitalize the seeds held in the hopper, and a spreader configured to discharge the devitalized seeds from the system. A first transport assembly interconnects the hopper and the mill, on the trailer, to transport the seeds from the hopper to the mill. And, a second transport assembly interconnects the mill and the spreader, on the trailer, to transport the devitalized seeds from the mill to the spreader.

16 Claims, 7 Drawing Sheets

SYSTEMS AND METHODS FOR PROCESSING CROPS HARVESTED FROM FIELDS

CROSS-REFERENCE TO RELATED APPLICATION

This application claims the benefit of, and priority to, U.S. Provisional Patent Application No. 63/236,501 filed Aug. 24, 2021, the entire disclosure of which is incorporated herein by reference.

FIELD

The present disclosure generally relates to systems and methods for processing crops harvested from fields and, in particular, to systems and methods for weighting the harvested crops and/or for devitalizing seeds (broadly, material) associated with the harvested crops and returning the devitalized material to the fields.

BACKGROUND

This section provides background information related to the present disclosure which is not necessarily prior art.

In connection with seed production and genetic advancement of seeds, plants are often grown from the seeds to evaluate various traits of the plants/seeds. Following such evaluation, the plants are typically harvested and seeds from the plants are collected. In doing so, the collected seeds may be subsequently used for commercialization, etc. Or, for certain regulated and/or stewarded plants/seeds, the collected seeds may be devitalized, for example, via heating or autoclaving so as to inhibit subsequent germination thereof. What's more, in some research and/or testing instances involving the collected seeds, it may be desired to return the devitalized material to the fields whereby the material is not subsequently transported or otherwise removed from the research and/or testing locations.

SUMMARY

This section provides a general summary of the disclosure, and is not a comprehensive disclosure of its full scope or all of its features.

Example embodiments of the present disclosure are generally directed to systems for processing seeds collected from a field.

In one example embodiment, a system for processing seeds collected from a field generally includes a hopper configured to hold seeds to be devitalized; a mill configured to devitalize the seeds held in the hopper; a spreader configured to discharge the devitalized seeds from the system; a first transport assembly interconnecting the hopper and the mill, the first transport assembly configured to transport the seeds from the hopper to the mill; and a second transport assembly interconnecting the mill and the spreader, the second transport assembly configured to transport the devitalized seeds from the mill to the spreader.

In another example embodiment, a system for processing seeds collected from a field generally includes a trailer having a tongue, and a coupler associated with the tongue for use in pulling the trailer; a hopper supported on the trailer, the hopper configured to hold seeds collected from a field on the trailer; a scale system associated with the trailer and configured to measure a weight of the seeds in the hopper; a discharge chute configured to discharge the seeds held in the hopper from the system; and a transport assembly interconnecting the hopper and the discharge chute, the transport assembly configured to transport the seeds from the hopper to the discharge chute.

Example embodiments of the present disclosure are also generally directed to methods for processing seeds collected from a field.

In one example embodiment, a method for processing seeds collected from a field generally includes receiving seeds in a hopper mounted on a trailer; transporting, by at least a first auger, the seeds from the hopper to a mill mounted on the trailer adjacent the hopper; devitalizing the seeds at the mill; transporting, by a second auger, the devitalized seeds from the mill to a spreader mounted to the frame at a rearward portion of the frame; and discharging, by the spreader, the devitalized seeds from the trailer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

FIGS. 1-13 illustrate an example embodiment of a system 100 for processing crops/seeds from fields, and where the system 100 includes one or more aspects of the present disclosure. In particular, the illustrated system 100 is operable to collect seeds from fields (e.g., receive harvested seeds from a combine, etc.), devitalize the seeds (e.g., grind, mill, etc. the seeds), and then return the devitalized seeds back to the fields. Additionally, the system 100 is operable to weigh the seeds collected from the fields. In connection therewith, the system 100 may be used to devitalize the collected seeds without weighing, or the system 100 may be used to weigh the collected seeds in connection with devitalizing the seeds, or the system 100 may be used to weigh the collected seeds in connection with transporting the collected seeds to processing facilities in lieu of devitalizing the seeds. That said, it should be appreciated that the system 100 may be used with any desired crops/seeds within the scope of the present disclosure including, for example, grains (e.g., corn, wheat, rice, etc.), legumes (e.g., soy, etc.), etc. Further, in view of the different uses of the system 100 identified above, it should also be appreciated that the system 100 may be used with either stewarded crops/seeds or non-stewarded crops/seeds, etc.

Figure 1:
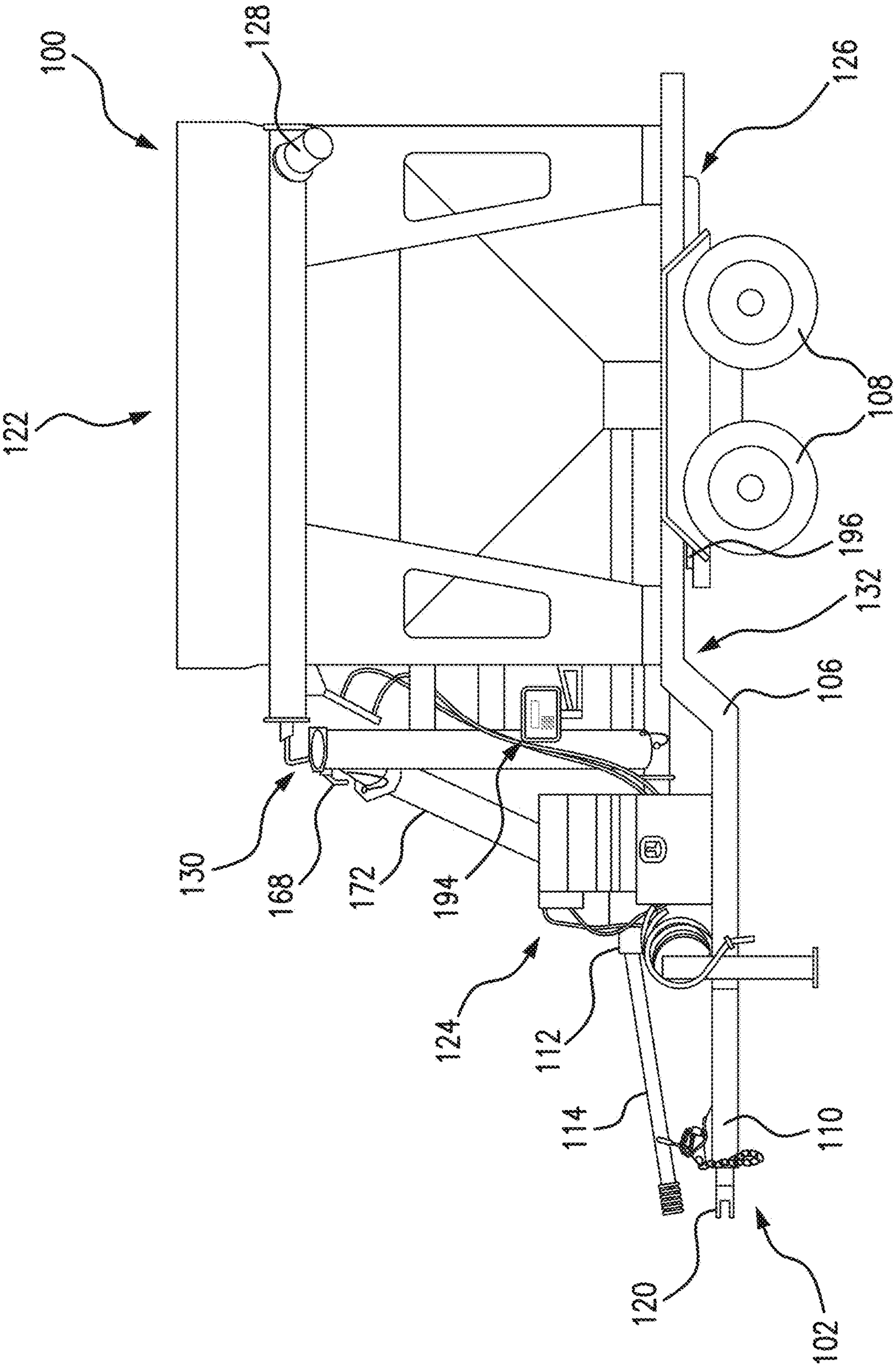
FIG. 1 is a perspective view of a trailer system of the present disclosure suitable for use in weighing and/or devitalizing harvested material from a field.
Figure 13:
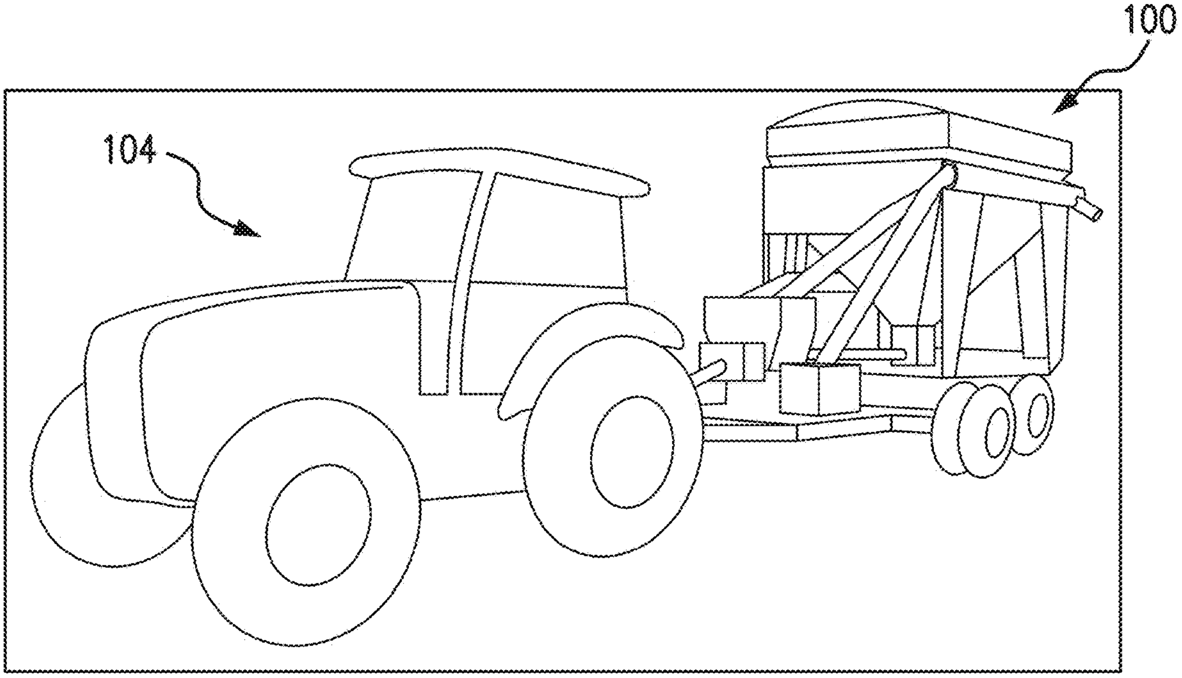
FIG. 13 is a perspective view of the trailer system of FIG. 1 coupled to a tractor.

As shown in FIG. 1, the system 100 of this example embodiment generally includes a trailer 102 configured to be pulled by a machine (e.g., a truck, a tractor 104 as shown in FIG. 13, etc.) during use of the system 100. In connection therewith, the trailer 102 includes a frame 106 supporting the various components of the system 100 described herein, and multiple wheels or tires (each indicated at reference number 108) to thereby allow movement of the trailer 102 with (e.g., behind, etc.) the machine, as the machine pulls the system 100. Additionally, a tongue 110 is provided at a forward portion of the frame 106 along with a coupler 120 to thereby enable the trailer system 100 to be attached to the machine (e.g., via a hitch of the machine (e.g., on a bumper of the machine, etc.), etc.). It should be appreciated that any suitable coupler 120 may be used with the trailer system 100 within the scope of the present disclosure (e.g., a ball-hitch coupler, a pin-hitch coupler, etc.). That said, while the system 100 is illustrated herein as having the trailer configuration (or cart configuration, or wagon configuration, etc.), and is generally referenced herein as a trailer system 100, it should be appreciated that the system 100 may be configured otherwise in other embodiments. For example, in some example embodiments the system 100 may include a configuration in which another machine is not required to pull the system 100, but the system 100 is instead self-propelled or integrated directly into a machine (without a trailer), etc. In other words, the present disclosure should not be considered as limited to systems having a trailer configuration.

With continued reference to FIG. 1, the trailer system 100 generally includes a hopper 122 supported by the frame 106 of the trailer 102 toward a rearward portion of the trailer 102. The hopper 122 is configured to hold seeds (e.g., seeds to be devitalized, seeds to be otherwise processed, etc.) collected from a field (e.g., seeds harvested from the field by a combine, seeds otherwise collected from the field, etc.). Additionally, in connection with devitalizing the collected seeds, the trailer system 100 includes a mill 124 (e.g., a roller/grinder mill, etc.) supported by the frame 106 of the trailer 102 toward the forward portion of the trailer 102 (adjacent the tongue 110) and a spreader 126 supported by the frame 106 toward the rearward portion of the trailer 102. The mill 124 is configured to receive seeds from the hopper 122 and devitalize the seeds, and the spreader 126 configured to receive the devitalized seeds from the mill 124 and then discharge the devitalized seeds from the trailer system 100 (e.g., rearward of the trailer system 100, etc.). And, in connection with operation of the trailer system 100 to discharge the collected seeds from the trailer system 100 without devitalizing the seeds, the trailer system 100 also includes a discharge chute 128 disposed adjacent the hopper 122 and configured to receive seeds from the hopper 122 and direct them off the trailer system 100 (e.g., to a storage container, to a transport vehicle, etc. whereby the discharged seeds are not devitalized).

The trailer system 100 further includes a first transport assembly 130 disposed generally between (e.g., interconnecting, etc.) the hopper 122, the mill 124, and the discharge chute 128. In connection therewith, the first transport assembly 130 is operable to selectively transport seeds from the hopper 122 to either the mill 124 (where the seeds are then devitalized) or to the discharge chute 128 (where the seeds are then directed off the trailer system 100 without being devitalized). And, a second transport assembly 132 is disposed generally between (e.g., interconnecting, etc.) the mill 124 and the spreader 126, to transport devitalized seeds from the mill 124 to the spreader 126 (for discharge from the trailer system 100).

Figure 2:
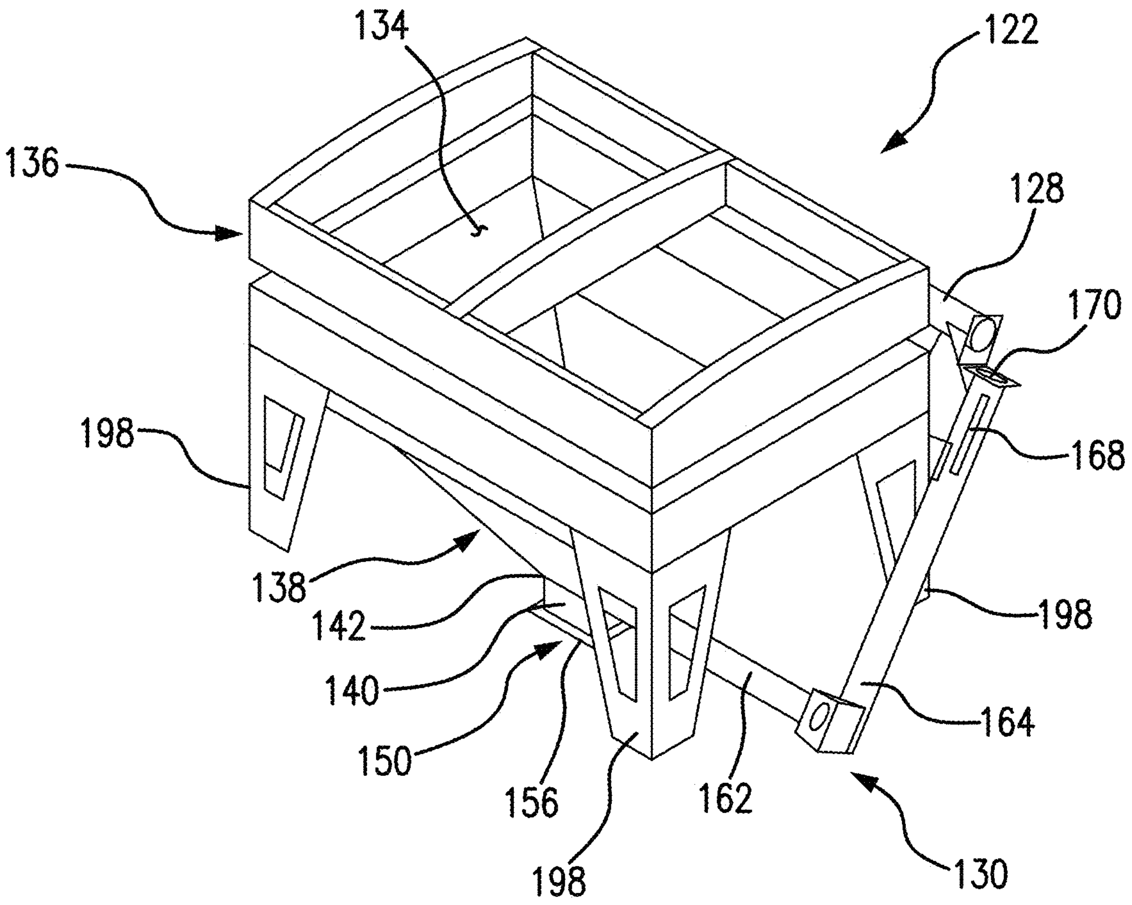
FIG. 2 is a perspective view of a hopper included in the trailer system of FIG. 1, with the hopper shown removed from the trailer system.
Figure 3:
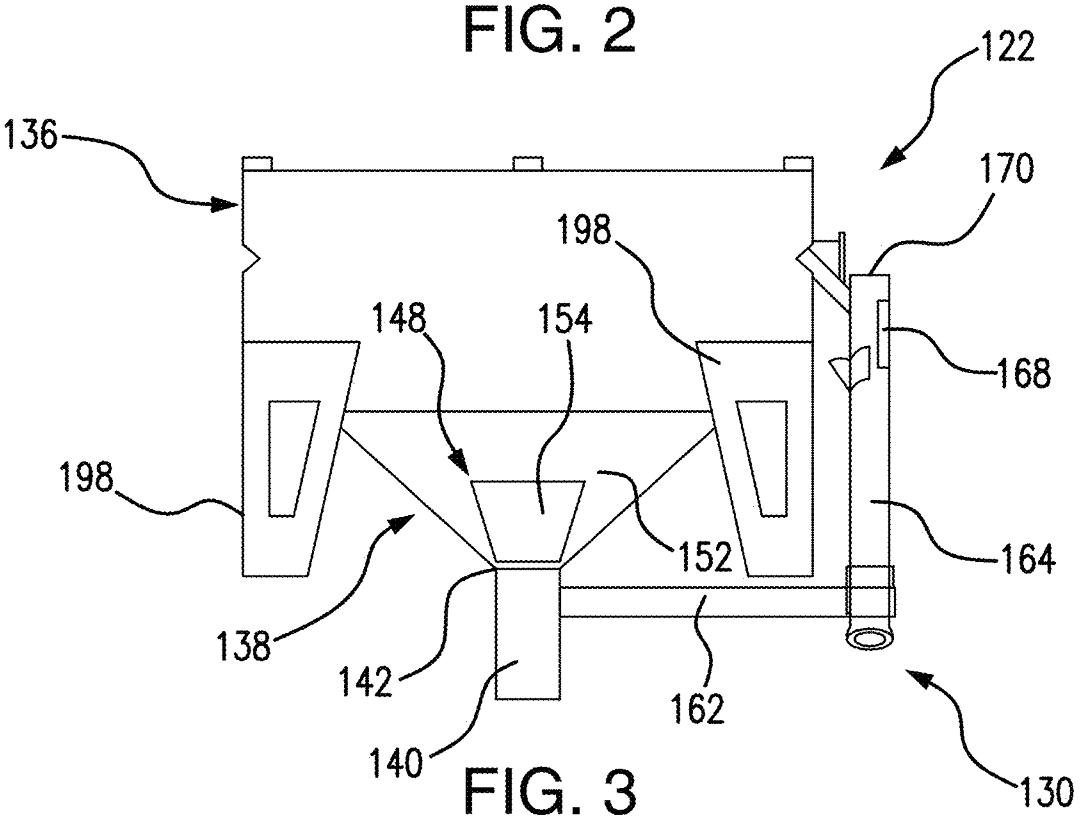
FIG. 3 is a side elevation view of the hopper of FIG. 2.

With reference now to FIGS. 2 and 3, the hopper 122 of the trailer system 100 defines an interior region 134 for receiving and holding seeds. In connection therewith, the hopper 122 includes a generally open upper portion 136 to allow the seeds to be placed in the hopper 122 and received in the interior region 134, and a generally tapered (or sloped, or funnel-shaped, etc.) lower portion 138. A cover, then, may be provided over the hopper 122 (over the open upper portion 136) in some embodiments to protect the seeds in the hopper 122 from environmental elements such as rain, snow, heat, etc. It should be appreciated that the hopper 122 may have any desired size within the scope of the present disclosure. For instance, in some example embodiments, the hopper 122 may have an overall height of between about 6 feet and about 12 feet (e.g., about 8 feet, etc.), and the open upper portion 136 of the hopper 122 may have a width dimension of between about 5 feet and about 12 feet (e.g., about 7 feet, etc.) and a length dimension of between about 5 feet and about 12 feet (e.g., about 10 feet, etc.). Additionally, it should be appreciated that the hopper 122 may be sized to hold any desired amount of seeds within the scope of the present disclosure, for example, about 10 bushels or less, about 25 bushels or less, about 50 bushels or less, between about 50 bushels and about 500 bushels, between about 100 bushels and about 250 bushels, greater than about 500 bushels, etc.

An outlet 140 is located at the lower portion 138 of the hopper 122 to facilitate removal of the seeds from the hopper 122 (e.g., via an opening in the lower portion 138 of the hopper 122 in communication with the outlet 140, etc.). In particular, seeds in the hopper 122 are configured to fall, slide, flow, move, etc. (e.g., under gravity, etc.) through the hopper 122 and are then directed (or funneled, etc.) by the tapered shape of the lower portion 138 into the outlet 140.

Figure 4:
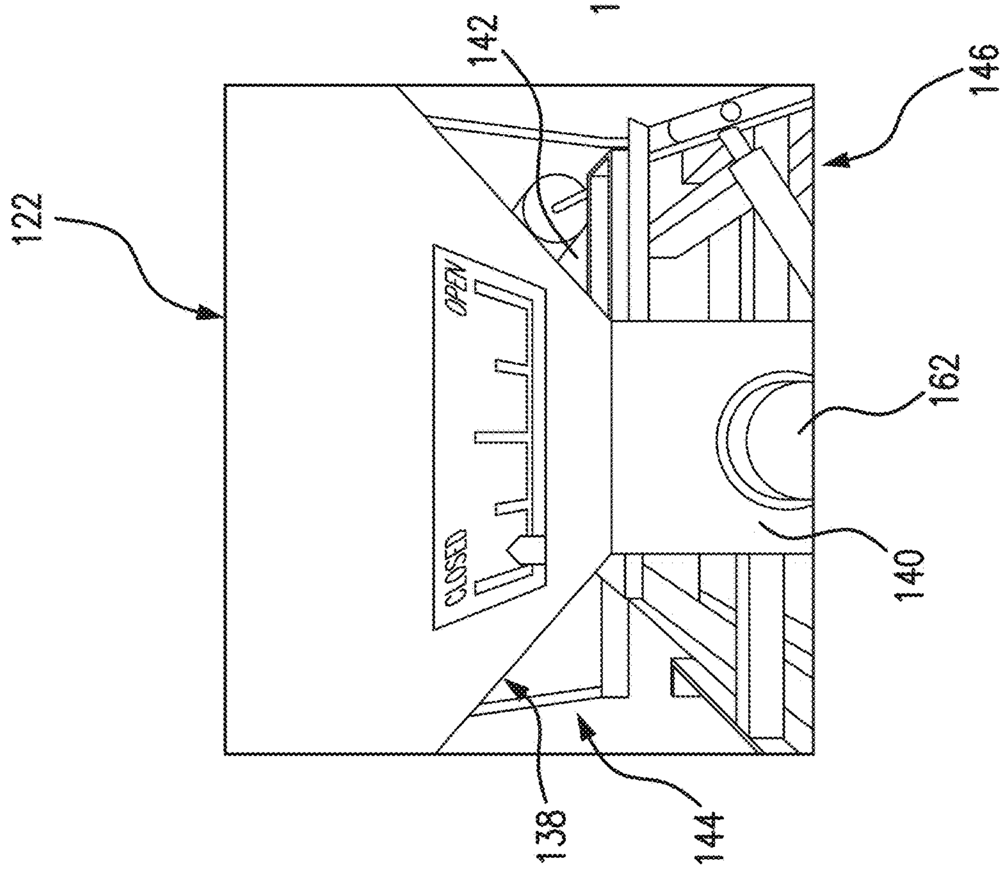
FIGS. 4 and 5 are perspective views of a gate included in the trailer system of FIG. 1, for use in controlling flow of seeds from the hopper.
Figure 5:
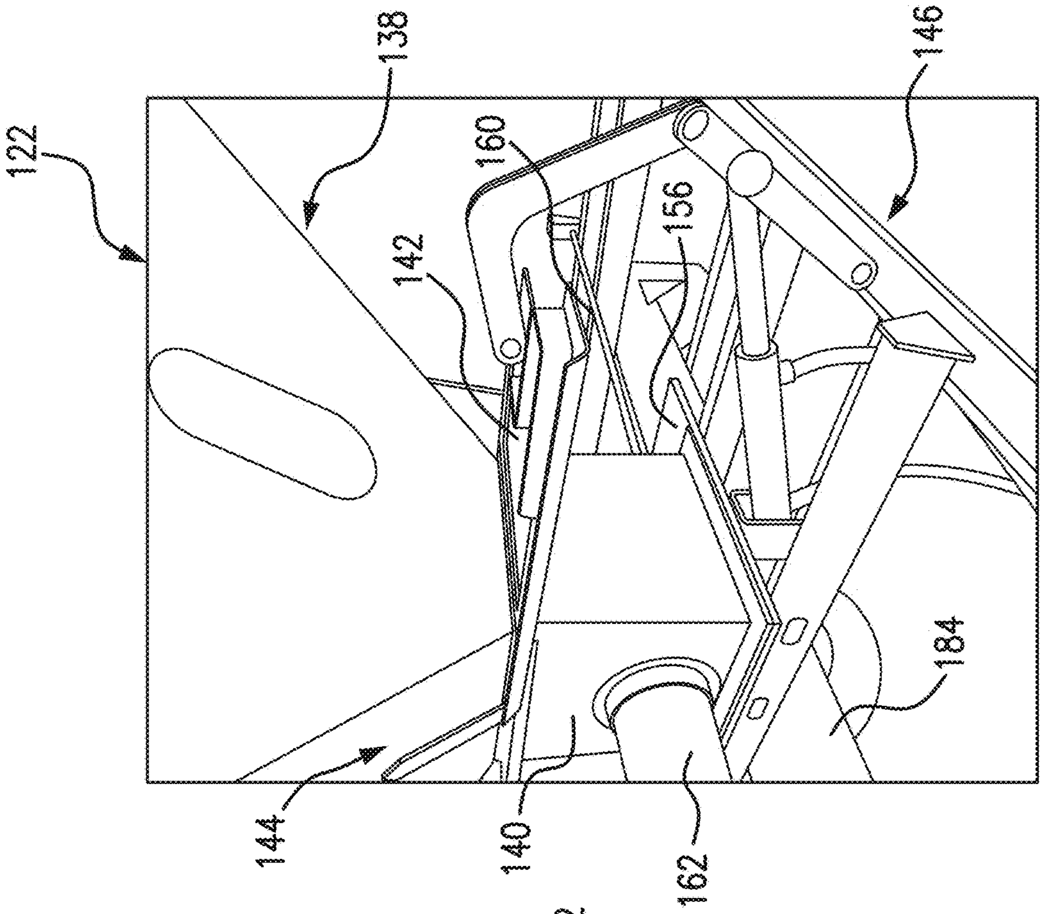

A gate 142, as additionally shown in FIGS. 4 and 5, is provided between the lower portion 138 of the hopper 122 and the outlet 140 to selectively block and allow movement of seeds from the hopper 122 into the outlet 140. As an example, when the seeds in the hopper 122 are to be stored or held in the hopper 122, the gate 142 may be actuated (e.g., moved, slid, etc.) to a closed position (broadly, the gate 142 may be actuated to close the hopper 122). In the closed position, then, the gate 142 is located within the hopper 122 and over the outlet 140 to block or inhibit flow of seeds out of the hopper 122 and into the outlet 140. And, when the seeds in the hopper 122 are to be directed to either the mill

124 or the discharge chute 128, the gate 142 may be actuated (e.g., moved, slid, etc.) to an open position (broadly, the gate 142 may be actuated to open the hopper 122). In the open position, the gate 142 is located out of the hopper 122 so that the seeds are free to pass out of the lower portion 138 of the hopper 122 and into the outlet 140 (for receipt by the first transport assembly 130, as will be described more hereinafter). A gauge 144 is provided adjacent the gate 142 to indicate a positon of the gate 142 relative to the hopper 122 and outlet 140, for example, in the closed position or open position. In connection therewith, the gate 142 may be partially opened/closed to control, restrict, etc. flow of seeds from the hopper 122 to the outlet 140, as desired (e.g., depending on a type of seeds in the hopper 122, etc.).

In the illustrated embodiment, the gate 142 includes a hydraulic actuator 146 (e.g., a hydraulic piston, etc.) operable to move the gate 142 relative to the hopper 122 and outlet 140 as desired. The hydraulic actuator 146 may be controlled away from the trailer system 100, for example, based on input from a user at a machine pulling the trailer system 100 (e.g., within a cab of a tractor pulling the trailer system 100, etc.), etc. That said, it should be appreciated that other actuators may be used to operate the gate 142 in other embodiments, for example, pneumatic actuators, electric motors, etc. What's more, in still other embodiments, the gate 142 may include a manual actuator operable to move the gate 142 as desired (e.g., a pull handle that can manually be moved by a user at the hopper 122, etc.).

Figure 7:
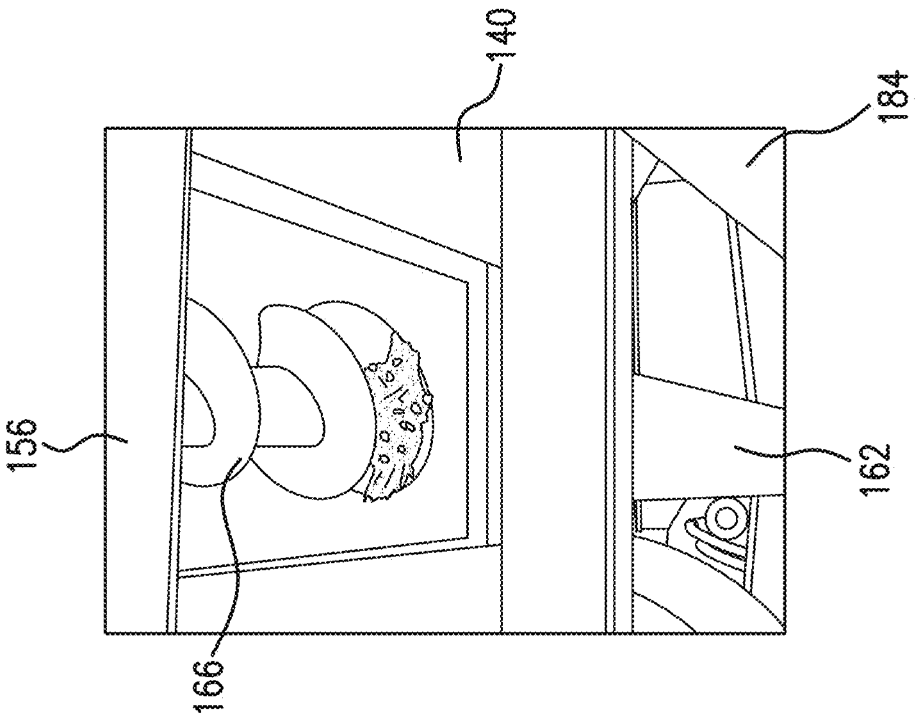
FIGS. 6 and 7 are perspective views of cleanout devices associated with the hopper of FIG. 2 and included in the trailer system of FIG. 1.
Figure 6:
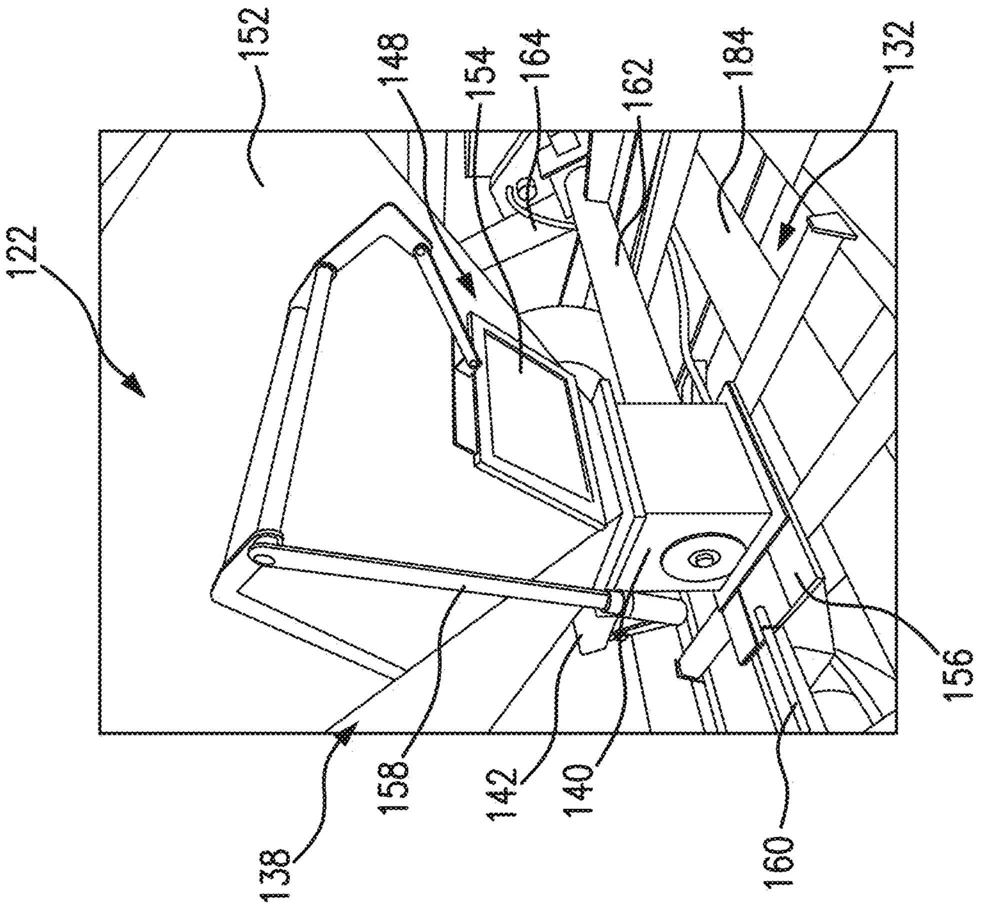

With additional reference to FIGS. 6 and 7, the hopper 122 also includes first and second cleanout devices 148, 150 to allow for inspecting and/or removing seeds from the interior region 134 of the hopper 122 (via the first cleanout device 148) and the outlet 140 of the hopper 122 (via the second cleanout device 150). The first cleanout device 148 is defined in a sidewall 152 of the lower portion 138 of the hopper 122, and includes a door 154 operable to slide generally along the sidewall 152 to selectively cover and expose an access opening into the hopper 122. And, the second cleanout device 150 is defined generally below (or under) the outlet 140, and similarly includes a door 156 operable to move relative to the outlet 140 to selectively cover and expose an access opening into the outlet 140. In the illustrated embodiment, the doors 154, 156 of the first and second cleanout devices 148, 150 are both manually operated (e.g., via handle 158 of the first cleanout device 148, via handle 160 of the second cleanout device 150, etc.) to move the doors 154, 156 and provide desired access to the hopper 122 and outlet 140. In other embodiments, though, the doors 154, 156 may be operated in other manners, for example, by hydraulic pistons, electric motors, etc. to selectively cover and expose the corresponding access openings of the hopper 122 and outlet 140.

Referring again to FIGS. 1-3, the first transport assembly 130 interconnects the hopper 122 with each of the mill 124 and the discharge chute 128. In connection therewith, the first transport assembly 130 is operable to receive seeds from the hopper 122, at the outlet 140, and transport (e.g., move, convey, push, etc. via one or more augers; etc.) the seeds to either the mill 124 for devitalization or to the discharge chute 128 for discharge from the trailer system 100 in lieu of being devitalized. For example, when seeds in the hopper 122 are to be devitalized, a diverter, baffle, etc. of the first transport assembly 130 is actuated to direct the seeds from the hopper 122 to the mill 124. The mill 124 then operates to devitalize the seeds (as will be described more hereinafter). Alternatively, when the seeds in the hopper 122 are to be discharged from the trailer system 100 in lieu of being devitalized, the diverter, baffle, etc. of the first transport assembly 130 is actuated to direct the seeds from the hopper 122 to the discharge chute 128 (where the seeds may be discharged from the trailer system 100).

In particular in the illustrated embodiment, the first transport assembly 130 generally incudes first and second pipes 162, 164 (e.g., conduits, channels, pathways, etc.) configured to transport seeds from the hopper 122 to either the mill 124 or the discharge chute 128. The first pipe 162 is coupled to the outlet 140 of the hopper 122 and extends from the outlet 140, generally below the hopper 122, to the second pipe 164. And, the second pipe 164 is disposed at a generally forward location of the hopper 122 and extends generally upward from the first pipe 162. Augers are then disposed within the first and second pipes 162, 164 (see, e.g., auger 166 in the first pipe 162 in FIG. 7, etc.) to facilitate movement of the seeds through the pipes 162, 164. The augers may be operated as desired, for example, via one or more hydraulic drives, pneumatic drives, etc. (as will be described more hereinafter).

That said, in operation of the first transport assembly 130, when seeds in the hopper 122 are to be devitalized, a gate 168 is initially positioned to block an open end portion 170 of the second pipe 164 (to block or cover the end portion 170). The seeds in the hopper 122 then move from the outlet 140, through the first and second pipes 162, 164 of the first transport assembly 130 (via the augers), to a feeder pipe 172 (e.g., a conduit, a channel, a pathway, etc.) coupled between the second pipe 164 and the mill 124. At the feeder pipe 172, then, the seeds pass out of the second pipe 164 and fall down the feeder pipe 172 (e.g., under gravity, etc.) to the mill 124. Alternatively, when the seeds in the hopper 122 are to be discharged from the trailer system 100 instead of being devitalized, the discharge chute 128 is moved into alignment with the open end portion 170 of the second pipe 164. And, the gate 168 is moved away from the open end portion 170 of the second pipe 164 and into a position over (or blocking) an inlet of the feeder pipe 172 (e.g., between the second pipe 164 and the feeder pipe 172, etc.) to inhibit the seeds from flowing out of the second pipe 164 and into the feeder pipe 172. The seeds from the hopper 122 then move through the first and second pipes 162, 164 to the discharge chute 128 for discharge from the trailer system 100. That said, each of the pipes 162, 164 of the first transport assembly 130 and the feeder pipe 172 may include any desired size within the scope of the present disclosure, for example, between about 4 inches and about 12 inches (e.g., about 6 inches, about 8 inches, etc.). What's more, in some embodiments, the first and second pipes 162, 164 of the first transport assembly 130 and the feeder pipe 172 may be the same size while in other embodiments the first and second pipes 162, 164 of the first transport assembly 130 and the feeder pipe 172 may be differently sized (e.g., the first pipe 162 may have a larger diameter than the second pipe 164 or vice versa, etc.).

Figure 8:
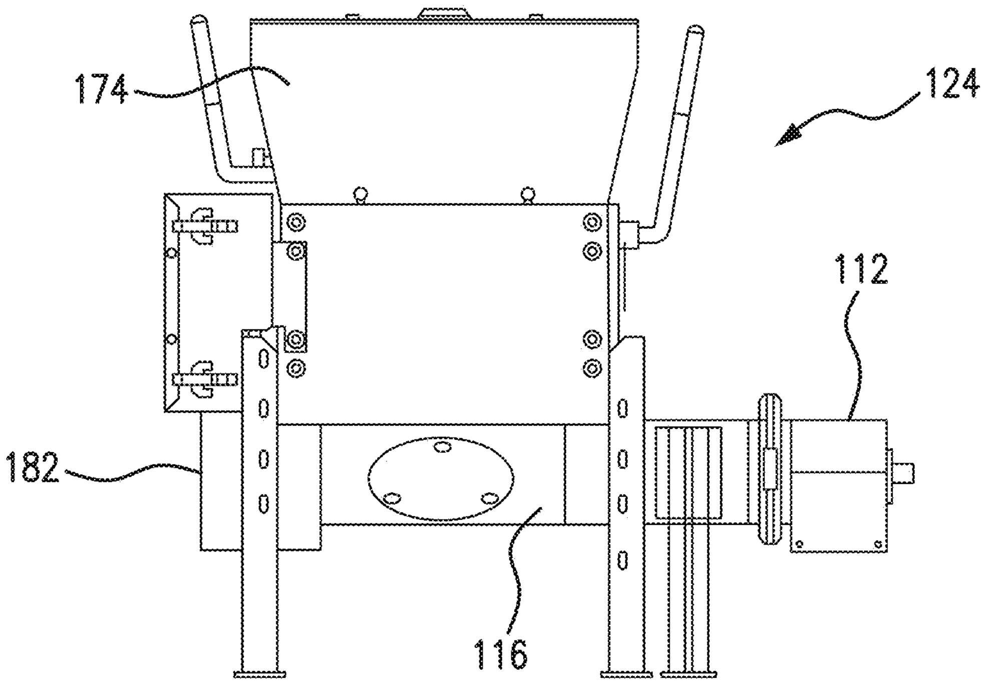
FIG. 8 is a side elevation view of a mill included in the trailer system of FIG. 1, with the mill shown removed from the trailer system.
Figure 9:
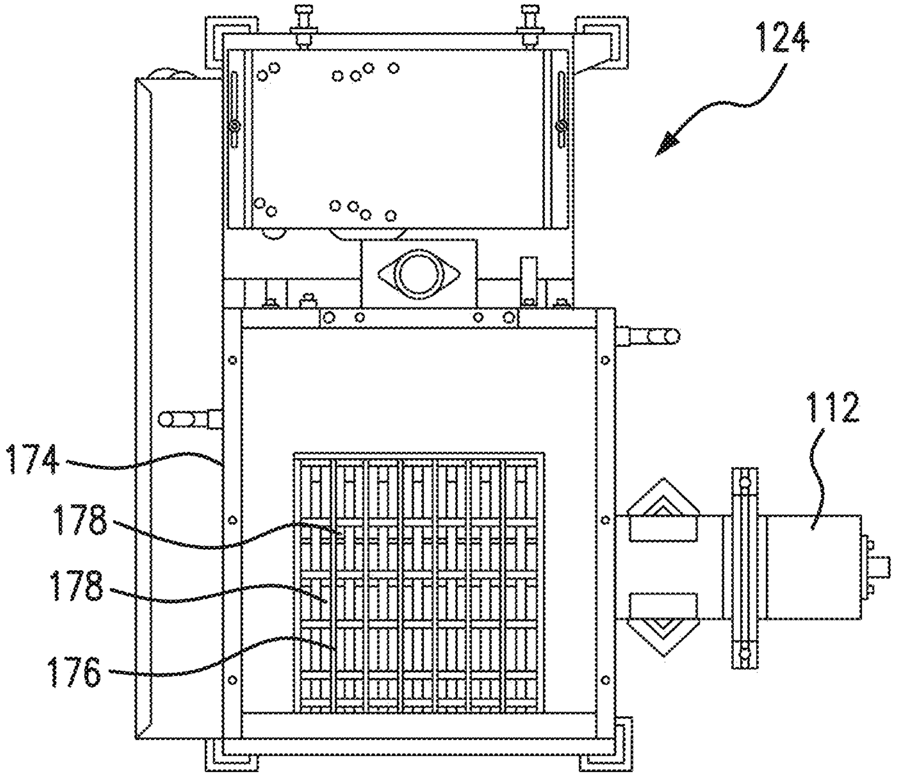
FIG. 9 is a top plan view of the mill of FIG. 8.

Referring now to FIGS. 8-9, the mill 124 of the trailer system 100 includes a basin 174 (or hopper) for receiving seeds from the hopper 122 (via the feeder pipe 172) that are to be devitalized. The mill 124 also includes multiple grates 176 disposed toward a lower portion of the basin 174, and rollers 178 disposed generally below the grates 176. The grates 176 operate to inhibit debris or other larger material potentially mixed with the seeds from passing through the basin 174 and to the rollers 178. And, the rollers 178 then operate to grind the seeds that pass through the grates 176 (thereby devitalizing the seeds). In some embodiments, the grates 176 may also be magnetic to further attract, filter, remove, etc. metal material from the seeds (and thereby inhibit such material from entering and damaging the rollers 178, etc.). In the illustrated embodiment, the mill 124 includes two rollers 178 configured to grind the seeds that pass through the grates 176. In other example embodiments, however, the mill 124 may include one roller, or more than two rollers (e.g., three rollers, four rollers, six rollers, eight rollers, etc.). Further, in some example embodiments, the mill 124 may include a commercially available mill or grinder, for example, such as that provided by Automatic Equipment Manufacturing, etc.

In operation of the mill 124, a cover 180 is provided over the basin 174 (see, FIG. 10), for example, to inhibit unwanted debris from entering the basin 174. And, the feeder pipe 172 extends into an opening defined in the cover 180 to thereby facilitate delivery of seeds from the hopper 122 into the basin 174. In the basin 174, then, the seeds fall through the grates 176 and to the rollers 178 (which rotate within the mill 124). In turn, the seeds pass between the rotating rollers 178, whereby the seeds are generally ground, crushed, sheered, damaged, or otherwise mechanically devitalized, etc. by the rollers 178 (e.g., whereby embryos of the seeds are fractured as the seeds pass between the rollers 178 rendering the seeds non-viable, etc.). The devitalized seeds are then moved to an outlet 182 of the mill 124, via a discharge auger of the mill 124 located generally below the rollers 178 (e.g., within housing 116, etc.), for subsequent discharge from the mill 124. That said, the mill 124 may be configured to grind the seeds at rates ranging from about 300 bushels per hour to about 1000 bushels per hour, from about 300 bushels per hour to about 750 bushels per hour, etc. In one particular embodiment, the mill 124 may include a grinding capacity of about 500 bushels per hour.

Figure 10:
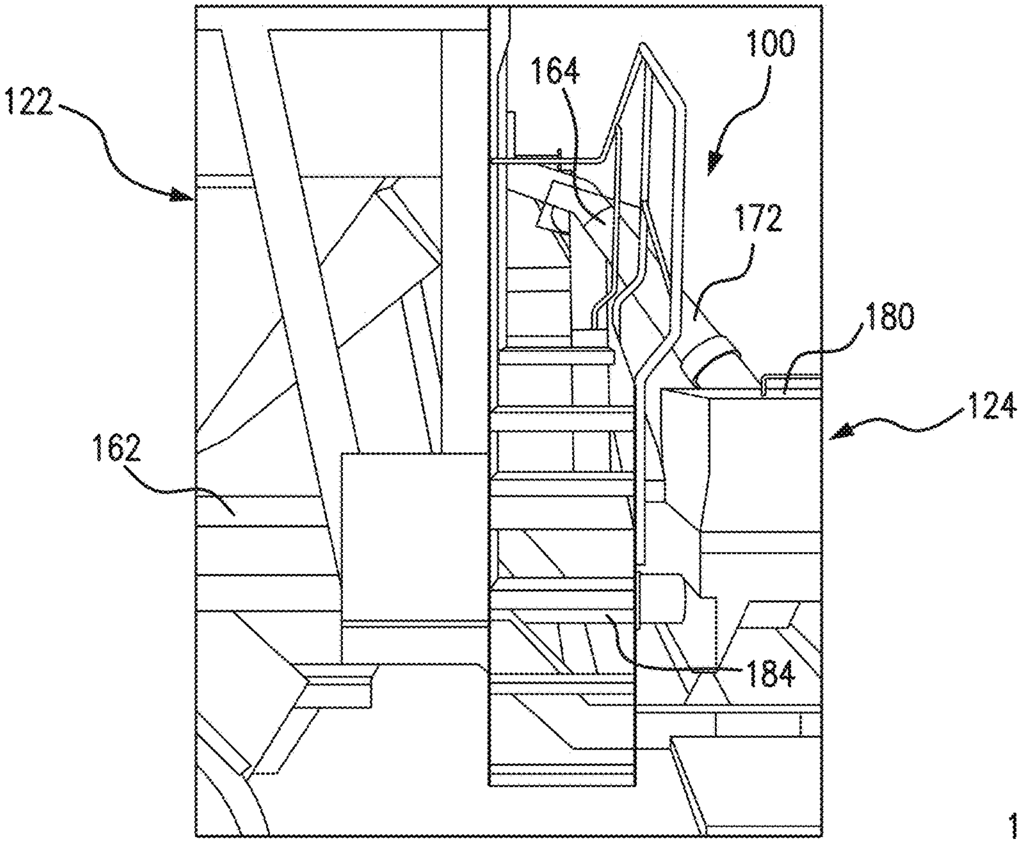
FIG. 10 is a fragmentary perspective view of first and second transport assemblies included in the trailer system of FIG. 1.
Figure 11:
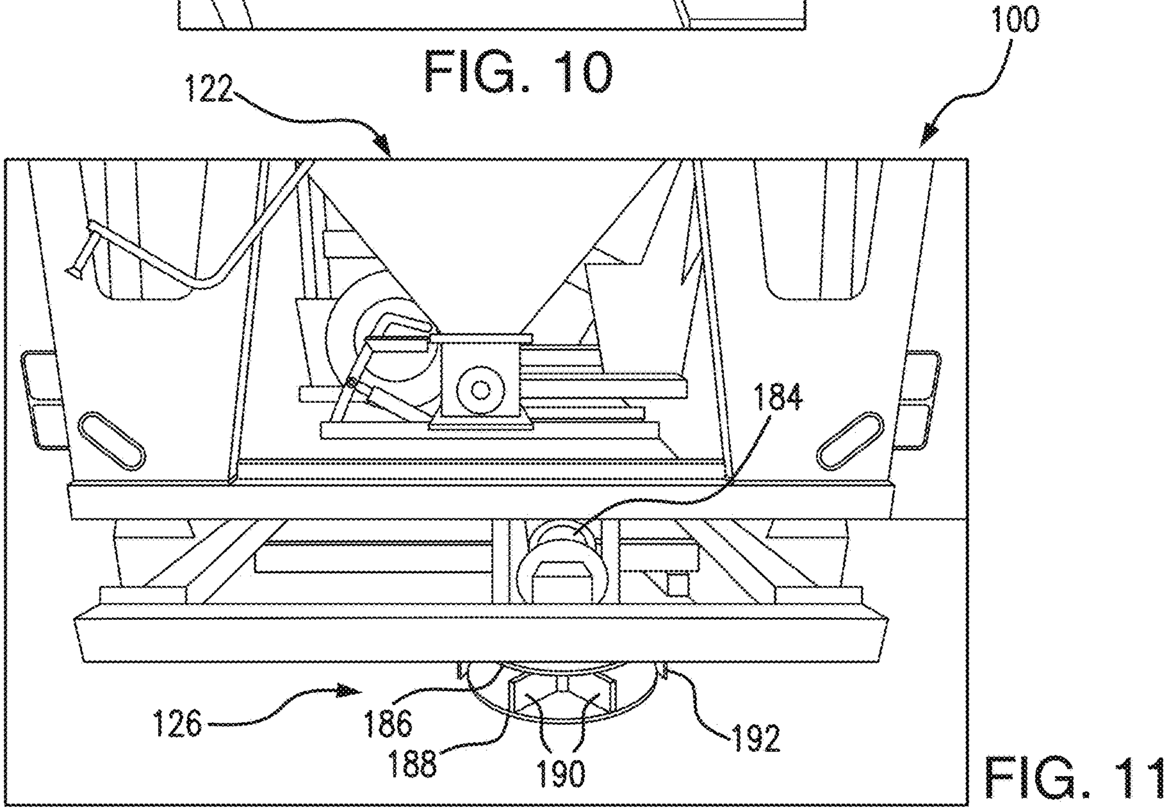
FIG. 11 is a perspective view of a spreader included in the trailer system of FIG. 1.
Figure 12:
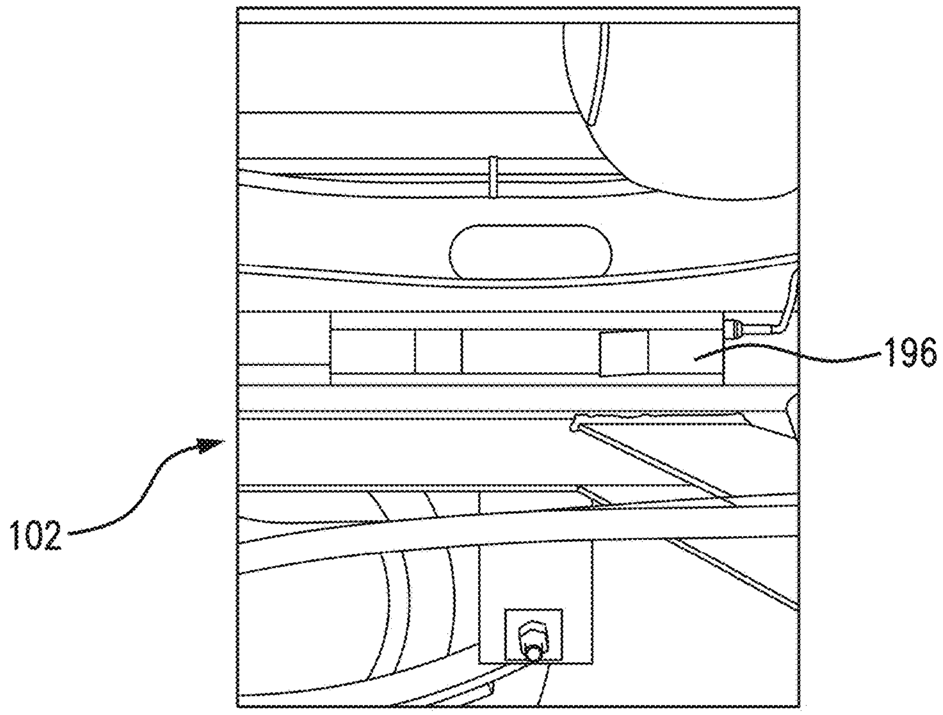
FIG. 12 is a perspective view of a load cell of a scale assembly included in the trailer system of FIG. 1.

With additional reference to FIGS. 10 and 11, the second transport assembly 132 is coupled to the mill 124 at the outlet 182 of the mill 124 (see, also, FIG. 8) and interconnects the mill 124 with the spreader 126. In connection therewith, the second transport assembly 132 is operable to receive devitalized seeds from the mill 124, at the outlet 182, and transport the seeds to the spreader 126. In the illustrated embodiment, the second transport assembly 132 incudes a pipe 184 (e.g., a conduit, a channel, a pathway, etc.) coupled to the outlet 182 of the mill 124 and extending from the mill 124, generally below the hopper 122, to the spreader 126. An auger (not shown) is then disposed within the pipe 184 to facilitate movement of the devitalized seeds through the pipe 184. The auger may be operated within the pipe 184 as desired, for example, via a hydraulic drive, a pneumatic drive, etc. That said, the pipe 184 of the of the second transport assembly 132 may include any desired size within the scope of the present disclosure, for example, between about 4 inches and about 12 inches (e.g., about 6 inches, about 8 inches, etc.).

The spreader 126 is configured to distribute the devitalized seeds, as received from the mill 124 via the pipe 184 of the second transport assembly 132, across a field, for example, behind the trailer system 100 (e.g., as the trailer system 100 moves across the field, etc.). In particular, the spreader 126 is rotated, for example, via a hydraulic drive, etc., whereby the rotation of the spreader 126 results in scattering, spreading, etc. of the seeds received from the pipe 184 of the second transport assembly 132. In the illustrated embodiment, the spreader 126 includes an upper cover 186, a lower cover 188, and multiple dividers 190 positioned therebetween. As such, as the devitalized seeds flow from the pipe 184 to the spreader 126, the spreader 126 receives the seeds between adjacent ones of the dividers 190. Then, as the spreader 126 rotates, it discharges (e.g., slings, throws, etc.) the devitalized seeds from between the dividers 190 rearward of the trailer system 100. A shield 192 is additionally positioned around a portion of the spreader 126 adjacent the pipe 184, to help direct the devitalized seeds in the rearward direction of the trailer system 100. That said, the spreader 126 may have any desired shape and/or size within the scope of the present disclosure. For example, the upper and lower covers 186, 188 of the spreader 126 may each have a generally circular configuration with a diameter of between about 8 inches and about 36 inches (e.g., about 24 inches, etc.).

In other embodiments, the spreader 126 may be operable to rotate to distribute the devitalized seeds across the field based on a flow of the devitalized seeds from the pipe 184 of the second transport assembly 132. For example, as the seeds from the pipe 184 engage the spreader 126, they may engage ones of the dividers 190 and causes the spreader 126 to then rotate (or spin). In doing so, as the spreader 126 rotates, it discharges (e.g., slings, throws, etc.) the devitalized seeds from between the dividers 190 rearward of the trailer system 100. Further, while a single spreader 126 is shown in the illustrated trailer system 100, it should be appreciated that the trailer system 100 may include more than the one spreader 126 in other example embodiments (e.g., two spreaders, three spreaders, four spreaders, etc.). For instance, in one particular embodiment, the trailer system 100 may include two spreaders (each similar to the spreader 126 in construction and operation) located toward the rearward portion of the trailer system 100 and spaced apart from each other (and generally offset from a center of the trailer system 100).

That said, the spreader 126 of the trailer system 100 is operable to generally evenly distribute (e.g., spray, scatter, spread, disperse, etc.) the devitalized seeds across a field. In doing so, the spreader 126 is also operable to distribute the devitalized seeds across a generally large surface area of the field to thereby reduce, minimize, or even eliminate concerns and/or presence of buildups of residual material associated with the devitalized seeds in specific areas of the field (e.g., operation of the spreader 126 as described herein may inhibit hotspots or strips of devitalized material in the field, etc.). As such, cross contamination of subsequent crops grown in the field in subsequent years or growing seasons may be inhibited. This may be of particular importance in research or trial fields where different trials of different seeds are implemented season after season (or year after year) in the same fields.

Referring again to FIG. 1, the trailer system 100 further includes a digital scale system operable to measure a weight of seeds included in the hopper 122. The scale system includes a controller 194 and multiple load cells 196 coupled (e.g., via a wired connection, via a wireless connection, etc.) to the controller 194. The load cells 196 are positioned generally under the hopper 122 (see, also, FIG. 12) and adjacent each leg 198 of the hopper 122 such that four load cells 196 are included in the illustrated trailer system 100 (but only one is visible in FIG. 1). In connection therewith, the load cells 196 are configured to measure a weight of seeds in the hopper 122 and generate electrical signals indicative of such weight and provide the signals to the controller 194. In turn, the controller 194 is configured to interpret the signals and provide an output thereof, in the form of a weight reading, at an output display of the controller 194 (e.g., the controller 194 may be configured to display the weight reading at the output display, etc.). That said, and as generally described above, by way of the scale system, the trailer system 100 may be used to weigh seeds collected in the hopper 122 in connection with devitalizing the seeds at the mill 124. Or, the trailer system 100 may be used to weigh the collected seeds in connection with transporting the collected seeds to processing facilities in lieu of devitalizing the seeds. Further, the scale system may also be used as a check and/or as a calibration tool for scales, yield monitors, etc. associated with combines or other agricultural equipment providing seeds to the hopper 122 of the trailer system 100 and/or receiving seeds from the hopper 122 of the trailer system 100, etc.

As described above, and as generally shown in FIG. 13, the trailer system 100 of the illustrated embodiment is configured to be pulled by a machine (e.g., tractor 104 in FIG. 13, a truck, etc.) during use. In connection therewith, the mill 124 of the trailer system 100 includes a drive coupling 112 (FIGS. 8 and 9) connected to a power take-off (PTO) shaft 114 (FIG. 1) of the trailer system 100. In operation of the trailer system 100, then, the PTO shaft 114 may be connected to the machine pulling the trailer system 100 (e.g., the tractor 104, etc.) whereby the mill 124 may be powered by the machine (e.g., the rollers 178 of the mill 124, a discharge auger of the mill 124, etc.). In some example embodiments, the machine pulling the trailer system 100 may provide at least about 85 horsepower or more to the mill 124 for operation of the mill 124. Additionally, other components of the trailer system 100 may also be powered by the machine as appropriate including, for example, the augers of the first and second transport assemblies, the spreader 126, etc.

In view of the above, the systems and methods herein provide for mobile processing of seeds at fields where the processing may include, for example, weighing of the seeds and/or devitalization of the seeds. Further, in some example embodiments, in connection with devitalizing the seeds, the systems and methods herein may be implemented in stewardship trials, whereby the systems may be sized to allow conventional transport thereof to and between fields involved in the trials (e.g., via trucks over highways, via tractors within fields, etc.) while also handling field sizes involved in the trials (at least about 20 acres, at least about 30 acres, at least about 50 acres, etc.). In such implementations, the systems and methods may receive seeds harvested from the fields by conventional combines, and then devitalize the seeds and return the devitalized seeds back to the fields involved in the trials (where the seeds are devitalized and returned to the fields at about the same time). In doing so, the systems and methods may generally evenly distribute the devitalized seeds across the fields to avoid buildup of such material in single locations of the fields.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for processing seeds collected from a field, the system comprising:
- a hopper configured to hold seeds to be devitalized, the seeds collected from a field;
- a mill configured to devitalize the seeds held in the hopper;
- a spreader configured to discharge the devitalized seeds from the system and back into the field;
- a first transport assembly interconnecting the hopper and the mill, the first transport assembly configured to transport the seeds from the hopper to the mill;
- a second transport assembly interconnecting the mill and the spreader, the second transport assembly configured to transport the devitalized seeds from the mill to the spreader; and
- a trailer;
  - wherein the hopper and the mill are disposed on a frame of the trailer; and
  - wherein the spreader is disposed generally below the frame of the trailer.

2. The system of claim 1, further comprising a scale system configured to measure a weight of the seeds in the hopper.

3. The system of claim 2, wherein the scale system includes a controller and at least one load cell in communication with the controller, the at least one load cell configured to transmit a signal indicative of a weight of the seeds in the hopper to the controller.

4. The system of claim 1, wherein the first transport assembly includes:
- at least one conduit connecting the hopper and the mill; and
- at least one auger disposed within the at least one conduit connecting the hopper and the mill.

5. The system of claim 1, wherein the second transport assembly includes:
- a conduit connecting the mill and the spreader; and
- at least one auger disposed within the conduit connecting the mill and the spreader.

6. The system of claim 1, wherein the trailer includes a tongue, and a coupler associated with the tongue for use in pulling the trailer; and
- wherein the mill is disposed adjacent the tongue, and wherein the hopper is disposed generally rearward of the mill.

7. The system of claim 1, wherein the spreader is a first spreader; and
- wherein the system further includes a second spreader configured to receive the devitalized seeds from the mill and discharge the devitalized seeds from the system.

8. The system of claim 1, wherein the hopper comprises a gate operable to selectively release the seeds from the hopper to the first transport assembly.

9. The system of claim 1, wherein the mill is configured to receive the seeds from the hopper; and wherein the mill includes at least one roller operable to grind the seeds received from the hopper.

10. The system of claim 1, further comprising a discharge chute configured to discharge the seeds held in the hopper from the system;
- wherein the first transport assembly further interconnects the hopper and the discharge chute, and wherein the first transport assembly includes a moveable gate operable to selectively direct the seeds from the hopper to either the mill or the discharge chute.

11. A method for processing seeds collected from a field, the method comprising:
- receiving seeds, collected from a field, in a hopper mounted on frame of a trailer;
- transporting, by at least a first auger, the seeds from the hopper to a mill mounted on the frame of the trailer adjacent the hopper;
- devitalizing the seeds at the mill;
- transporting, by a second auger, the devitalized seeds from the mill to a spreader disposed generally below the frame of the trailer; and
- discharging, by the spreader, the devitalized seeds from the trailer back into the field.

12. The method of claim 11, wherein receiving the seeds in the hopper includes receiving the seeds in the hopper from a combine, as the seeds are harvested from a field.

13. The method of claim 11, wherein devitalizing the seeds and discharging the devitalized seeds from the trailer occur at about the same time.

14. The method of claim 11, further comprising determining, by a scale system associated with the trailer, a weight of the seeds in the hopper.

15. The method of claim 14, further comprising displaying, by a controller of the scale system, the determined weight.

16. The method of claim 11, further comprising pulling the trailer through a field and, while pulling the trailer, discharging, by the spreader, the devitalized seeds from the trailer back into the field.

* * * * *